United States Patent
Crawshaw et al.

(10) Patent No.: US 12,335,226 B2
(45) Date of Patent: Jun. 17, 2025

(54) MANAGEMENT OF DOMAIN NAME SYSTEM (DNS) QUERIES IN COMPUTING SYSTEMS

(71) Applicant: Tailscale Inc., Toronto (CA)

(72) Inventors: David J. Crawshaw, Berkeley, CA (US); David Anderson, Victoria (CA); Avery Pennarun, Montreal (CA)

(73) Assignee: Tailscale Inc., Toronto (CA)

( * ) Notice: Subject to any disclaimer, the term of this patent is extended or adjusted under 35 U.S.C. 154(b) by 64 days.

(21) Appl. No.: 18/165,781

(22) Filed: Feb. 7, 2023

(65) Prior Publication Data

US 2023/0254278 A1 Aug. 10, 2023

Related U.S. Application Data

(60) Provisional application No. 63/307,920, filed on Feb. 8, 2022.

(51) Int. Cl.
*H04L 61/4511* (2022.01)
*H04L 12/46* (2006.01)
*H04L 61/2503* (2022.01)

(52) U.S. Cl.
CPC ...... *H04L 61/4511* (2022.05); *H04L 12/4633* (2013.01); *H04L 61/2503* (2013.01)

(58) Field of Classification Search
CPC ............. H04L 61/4511; H04L 12/4633; H04L 61/2503; H04L 61/2514; H04L 61/2592; H04L 61/2557
See application file for complete search history.

(56) References Cited

U.S. PATENT DOCUMENTS

| | | | |
|---|---|---|---|
| 7,559,085 B1 * | 7/2009 | Wahl | H04L 61/30 726/17 |
| 8,499,034 B2 * | 7/2013 | Karasaridis | H04L 61/4511 709/219 |
| 8,499,077 B2 * | 7/2013 | Niemela | H04L 61/4511 709/225 |
| 9,059,884 B2 * | 6/2015 | Robinson | H04L 61/4511 |
| 9,130,884 B2 * | 9/2015 | Huang | H04L 61/256 |
| 9,137,300 B1 * | 9/2015 | Marshall | H04L 67/1001 |
| 9,137,301 B1 * | 9/2015 | Dunlap | H04L 65/752 |
| 9,544,278 B2 * | 1/2017 | Hozza | H04L 63/0442 |
| 9,906,947 B2 * | 2/2018 | Stojanovski | H04L 61/256 |
| 9,973,590 B2 * | 5/2018 | Wu | H04L 67/568 |
| 10,033,691 B1 * | 7/2018 | Mizik | H04L 67/10 |
| 10,419,330 B2 * | 9/2019 | Cheng | H04L 12/4641 |
| 10,616,179 B1 * | 4/2020 | McCarriar | H04L 61/2514 |
| 11,122,004 B1 * | 9/2021 | Kaczmarek | H04L 61/106 |
| 11,606,388 B2 * | 3/2023 | Phillips | H04L 63/1466 |
| 2021/0152516 A1 * | 5/2021 | Moreno | H04L 12/4679 |

* cited by examiner

*Primary Examiner* — Alex H. Tran

(57) ABSTRACT

Described herein are systems, methods, and software to manage domain name system (DNS) requests in a computing system. In one example, a computing system identifies a DNS request from an application on the computing system and, in response to the request, identifies a DNS server to support the DNS request from a plurality of DNS servers based on a domain in the DNS request. The computing system further forwards the DNS request to the DNS server, wherein the DNS server is located on the computing system, obtains a response to the DNS request from the DNS server, wherein the response indicates a private internet protocol (IP) address in a private network subnet, and provides the response to the application.

20 Claims, 6 Drawing Sheets

MANAGEMENT OF DOMAIN NAME SYSTEM (DNS) QUERIES IN COMPUTING SYSTEMS

RELATED APPLICATIONS

This application hereby claims the benefit of and priority to U.S. Provisional Patent Application No. 63/307,920, titled "MANAGEMENT OF DOMAIN NAME SYSTEM (DNS) QUERIES IN COMPUTING SYSTEMS," filed Feb. 8, 2022, and which is hereby incorporated by reference in its entirety.

TECHNICAL BACKGROUND

In computing networks, domain name system (DNS) requests are used by computing elements to identify internet protocol (IP) addresses associated with domain names. For example, a computing element, such as a desktop computer, may generate a DNS request with a uniform resource locator (URL) that is provided to a DNS resolver. The DNS resolver may then forward the request to a nameserver, which returns an IP address associated with the URL. Once the IP address is received, the computing element may request and receive the required data from the destination service that corresponds to the obtained IP address.

Although DNS requests may be resolved using a single resolver, issues can arise when administrators or users desire the use of multiple nameservers in association with different domains or URLs. For example, an organization may desire that DNS requests associated with a specific domain are resolved using a first nameserver, while DNS requests associated with other domains are resolved using a second nameserver. Accordingly, requests must be directed to the corresponding server to provide the desired IP address.

SUMMARY

The technology described herein manages the direction of domain name system (DNS) queries to different DNS servers. In one implementation, a method of operating a computing system includes identifying a DNS request from an application on the computing system. In response to the request, the method further provides identifying a DNS server to support the request from a plurality of DNS servers based on the domain in the DNS request. The method further provides forwarding the DNS request to the DNS server, wherein the DNS server is located on the computing system. The method further includes obtaining a response to the DNS request from the DNS server, wherein the response indicates a private internet protocol (IP) address in a private network subnet. Once obtained, the method provides for communicating the response to the application.

DETAILED DESCRIPTION

Figure 1:
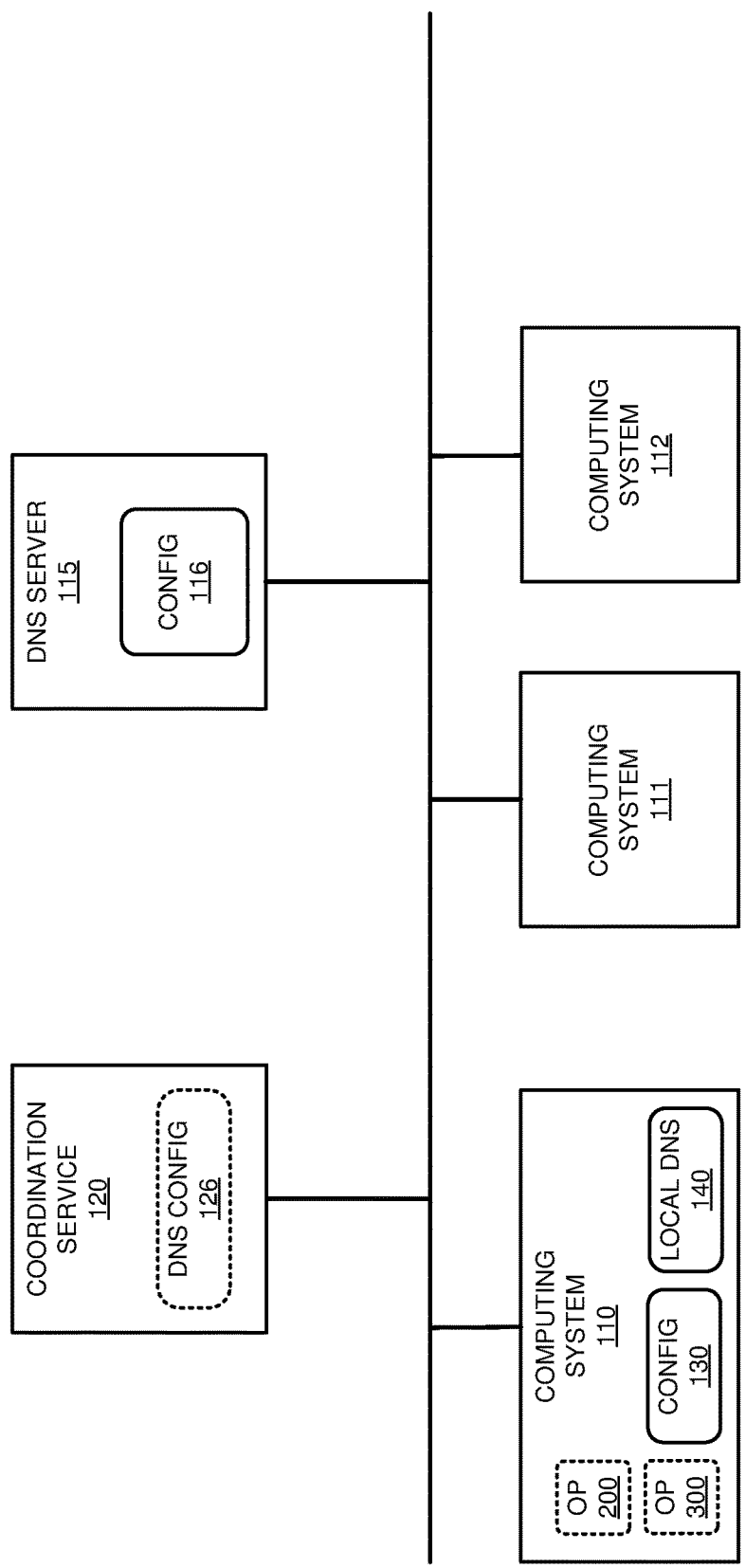
FIG. 1 illustrates a computing environment to manage the direction of domain name system (DNS) requests in computing systems according to an implementation.

FIG. 1 illustrates a computing environment 100 to manage the direction of domain name system (DNS) requests in computing systems according to an implementation. Computing environment 100 includes coordination service 120, computing systems 110-112, and DNS server 115. Computing element 110 includes configuration 130 and local DNS server 140, and DNS server 115 further includes configuration 116. Coordination service 120 includes DNS configuration 126 that can be distributed to computing elements 110-112. Computing element 110 further implements operations 200 and 300 that are described below in FIGS. 2 and 3, respectively.

In computing environment 100, computing systems 110-112 comprise physical or virtual computing systems of a private computing network. Computing systems 110-112 may comprise physical computing systems, such as servers, desktop computing systems, laptop computing systems, smartphones, or some other physical computing system, or may comprise virtual computing systems, such as virtual machines, containers, or some other virtualized endpoint. To join the private network, each computing system of computing systems 110-112 may communicate with coordination service 120, wherein coordination service 120 may provide networking configuration information to each of the computing systems. In at least one implementation, coordination service 120 may distribute a DNS configuration 126 to computing systems 110-112, wherein DNS configuration 126 may permit each computing system to direct DNS requests with different domains to different DNS servers. The DNS servers may exist locally on the same computing system or may exist on external computing systems, such as DNS server 115.

In the present implementation, computing system 110 is provided with configuration 130 corresponding to the DNS configuration 126 from coordination service 120, and further includes local DNS server 140. Local DNS server 140 is used to associate one or more domains with private internet protocol (IP) addresses associated with the private network. When a DNS request is generated at computing system 110 by an application, the operating system or another service executing on computing system 110 may identify a DNS server to support the request based on configuration 130. For example, a first set of domains may supported using a first DNS server, while a second set of domains may be supported using a second DNS server. The server may be local, including local DNS server 140, or may comprise a DNS server available over a network, such as DNS server 115.

When a request includes a domain associated with local DNS server 140, the request may be forwarded to local DNS server 140, wherein local DNS server 140 associates the domain in the request to a private IP address associated with the private network. Specifically, each computing system in the private network may include a local DNS server that associates one or more domains to IP addresses in the private network, wherein the private network may include an IP subnet. Once a private IP address is identified for the request, the private IP address can be returned to the requesting application, wherein the application may use the private IP address as a destination address for a packet. When the packet is identified for the application, the private IP address can be associated with a public IP address and the packet can be encapsulated using the public IP address as the destination IP address for the packet. Once encapsulated, the packet can be forwarded to a destination computing system.

In at least one implementation, coordination service 120 may distribute private networking information to each computing system of computing systems 110-112. The private networking information may include associations between private and public IP addresses, encryption parameters for encrypting the payload of the packets, or some other information for the packet. When a computing system joins the private network, the computing system may provide credentials, such as usernames, passwords, tokens, or some other credential to coordination service 120. Coordination service 120 may identify the credentials and distribute private networking configuration information based on the credentials. For example, computing system 110 may be provided with addressing information that associates private IP addresses for computing systems 111-112 and encryption parameters for communicating with computing systems 111-112. When a packet is identified with a private IP address destination (e.g., private IP address for computing system 111), the packet is encapsulated using a public IP address in the header associated with the private IP address. Once encapsulated, the packet is forwarded toward the destination computing system. The destination computing system then decapsulates the packet using information from coordination service 120 and forwards the packet to the destination application.

Figure 2:
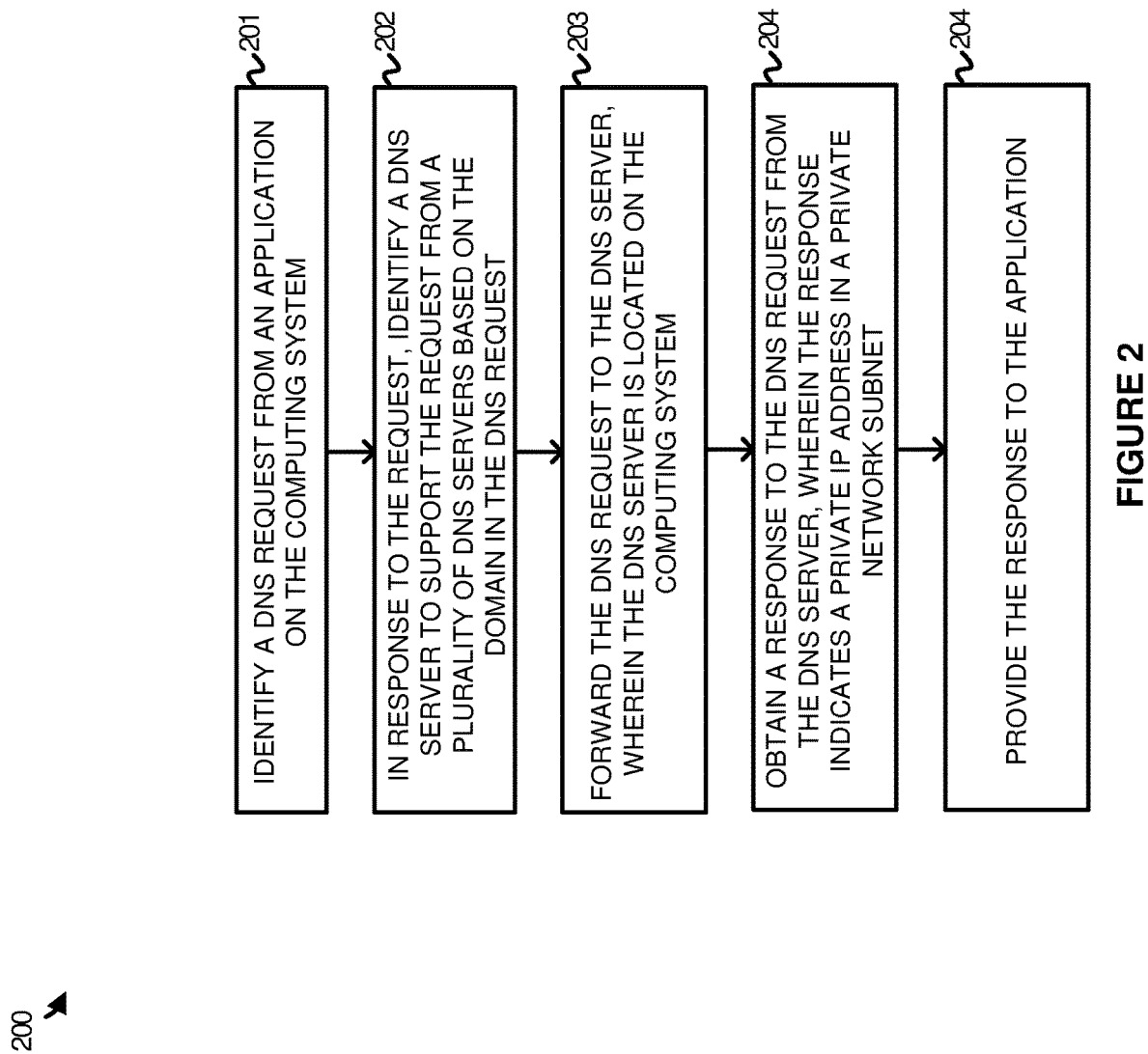
FIG. 2 illustrates an operation of a computing system to manage DNS request according to an implementation.

FIG. 2 illustrates an operation 200 of a computing system to manage DNS request according to an implementation. The steps of operation 200 are referenced parenthetically in the paragraphs that follow with reference to systems and elements of computing environment 100 of FIG. 1. Although demonstrated using computing system 110, similar processes may be performed by computing systems 111-112. Operation 200 may be performed by a standalone application or service on computing system 110 or may be performed at least in part by the operating system of computing system 110.

In operation 200, computing system 110 identifies (201) a DNS request from an application on the computing system and, in response to the request, identifies (202) a DNS server to support the DNS request from a plurality of available DNS servers based on a domain in the DNS request. In some implementations, coordination service 120 may distribute DNS configuration 126 that is implemented as configuration 130 on computing system 110. Configuration 130 is used to associate domains with a corresponding DNS server. For example, a first set of domains may be directed to local DNS server 140, while a second set of domains may be directed to DNS server 115. The associations between the domains and the domain servers may be defined by an administrator of the private computing network, wherein the configuration may be distributed from coordination service 120 to various computing systems joining the private network. In some examples, a DNS server may be local to the computing system, permitting a DNS lookup without communicating to external devices and servers.

Here, when the identified DNS server is identified as local to computing system 110, operation 200 forwards (203) the DNS request to the local DNS server and obtains (204) a response to the DNS request from the DNS server, wherein the response indicates a private IP address in a private network subnet. Once obtained from the DNS server, the response is provided (205) to the requesting application. In some implementations, coordination service 120 provides a configuration that permits computing system 110 to implement a local DNS server on the computing system. The local DNS server may be used to associate one or more domains with private IP addresses in a private network, wherein the private IP addresses correspond to different computing systems in the private network.

In some implementations, configuration 130 and local DNS server 140 may be updated via push commands from coordination service 120. The updates may be used to change the available DNS servers for resolving DNS requests, may be used to update DNS to IP address associations, or may comprise some other update in association with the private network. For example, when computing system 112 joins the private network, coordination service 120 may provide addressing information to computing systems 110-111, wherein the addressing information may be used to update the associations of domains to IP addresses. The update may include adding or modifying an entry in local DNS server 140 such that a request with a particular domain is directed to a private IP address associated with computing system 112.

In some implementations, when the DNS configuration is provided to the computing system, the coordination service may provide a search domain associated with computing systems in the private network. The search domain may be used to append to a device identifier or name associated with a computing system to generate a domain request. As an example, when computing system 112 joins a private network using coordination service 120, coordination service 120 may allocate a unique identifier to computing system 112. This unique identifier may also be edited or modified by an administrator associated with the private network. The unique identifier is then used in association with a search domain that is provided to the computing systems in the private network to provide a unique domain name for computing systems in the private network. Using the example of computing system 112, coordination service 120 may assign a unique identifier of "CS112" and a search domain of "www.example.com" that is provided to the other computing systems in the private network. The search domain is a domain that is used as part of a domain search list, where "CS112" may not be a full domain, but the search domain may be appended to the unique identifier to generate a complete domain name that can be resolved using the local DNS server on the computing system. Here, the full domain for a request would comprise "www.example.com/CS112." This domain could then be resolved using the DNS server that would respond to a query with the domain with a private IP address for computing system 112.

Figure 3:
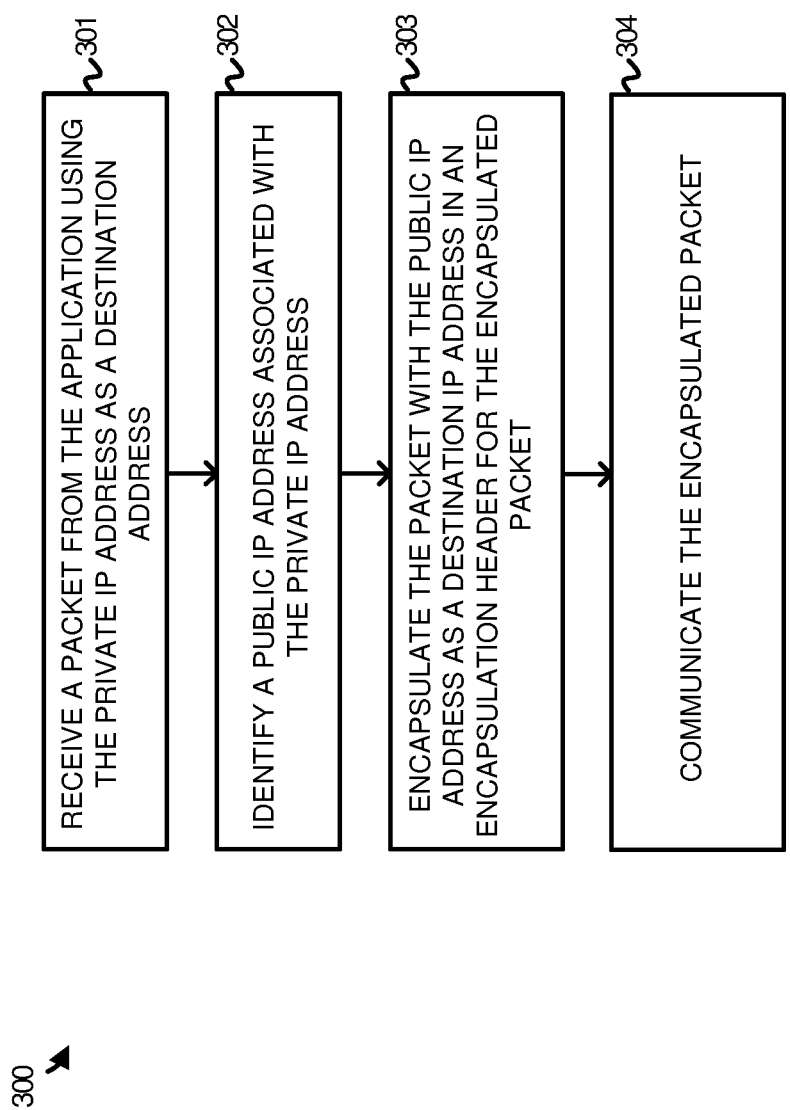
FIG. 3 illustrates an operation of a computing system to encapsulate egress packets according to an implementation.

FIG. 3 illustrates an operation 300 of a computing system to encapsulate egress packets according to an implementation. The steps of operation 300 are referenced parenthetically in the paragraphs that follow with reference to systems and elements of computing environment 100 of FIG. 1. Operation 300 is a continuation of operation 200 of FIG. 2.

For operation 300, computing system 110 may identify (301) a packet from the application using the private IP address as the destination address. In response to identifying the packet, computing system 110 may identify (302) a public IP address associated with the private IP address and may encapsulate (303) the packet with the public IP address as a destination IP address in an encapsulation header for the encapsulated packet. In some implementations, computing system 110 may maintain at least one data structure that associates private IP addresses with public IP addresses, encryption parameters, or other information that facilitates the communication between computing systems in the private network. When a packet is identified with a destination IP address that is a private IP address, operation 300 may identify a public IP address associated with the destination IP address and may encapsulate the packet with the public IP address in the header of the encapsulated packet. In some implementations, computing systems that join a private network may be associated with private and public encryption keys, wherein the packet can be encrypted using the encryption keys and public addressing information can be added to the encapsulation header. Once the encapsulated packet is generated, the encapsulated packet is communicated toward a destination computing system in the private network.

Although demonstrated in the previous example as communicating a packet using a private IP address, computing system 110 may further process packets that are communicated to public destinations. For example, an application on computing system 110 may generate a DNS request that is resolved using DNS server 115. DNS server 115 may provide a public IP address that is associated with the requested domain. When the public IP address is identified for the egress packet, the packet can be communicated by computing system 110 without encapsulation.

Figure 4:
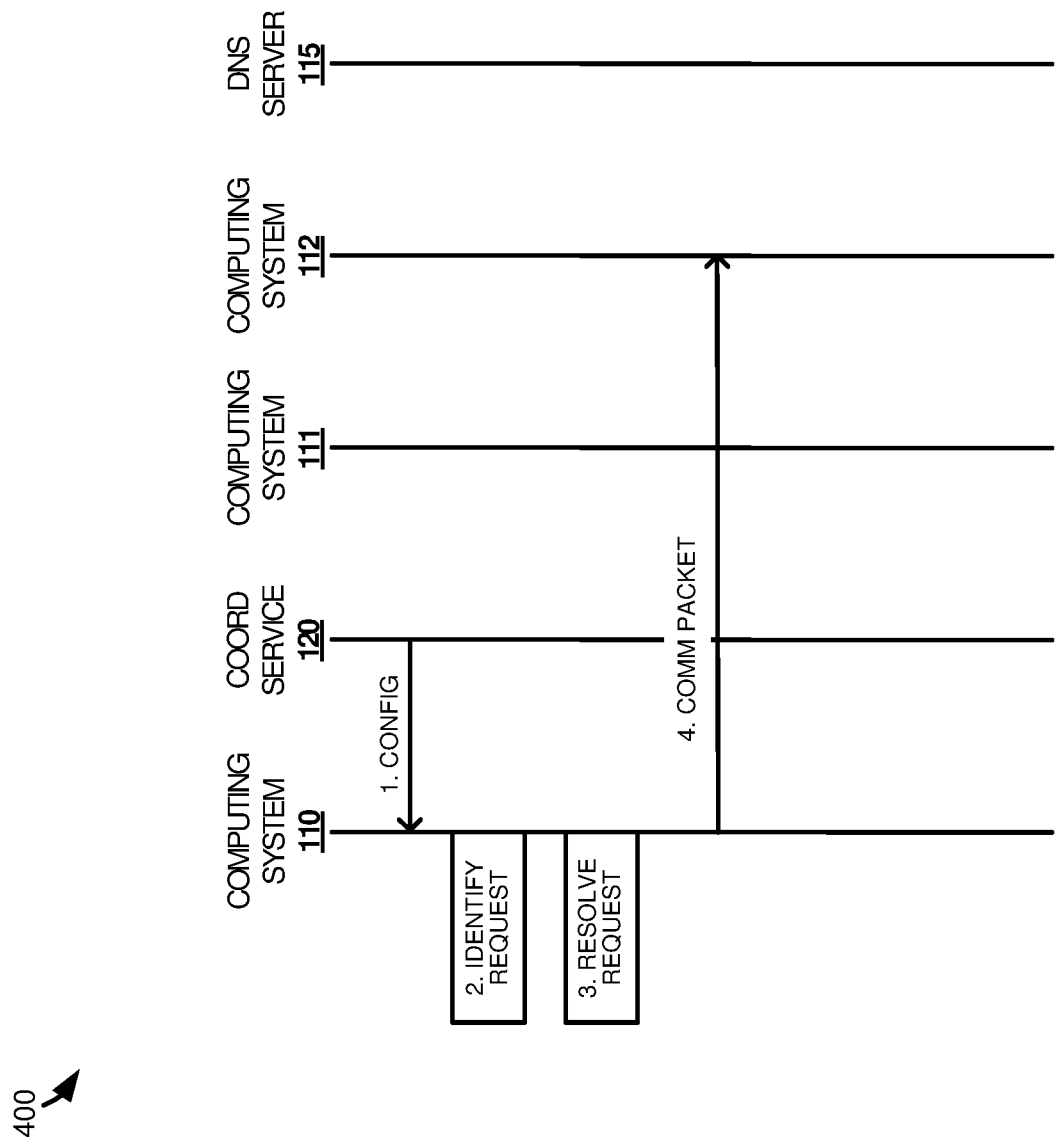
FIG. 4 illustrates a timing diagram of locally resolving a DNS request according to an implementation.

FIG. 4 illustrates a timing diagram 400 of locally resolving a DNS request according to an implementation. Timing diagram 400 includes computing systems 110-112, coordination service 120, and DNS server 115 from computing environment 100 of FIG. 1.

In timing diagram 400, coordination service 120 provides, at step 1, configuration information to computing system 110, wherein the configuration information is used by computing system 110 to identify a DNS server to support a request from a plurality of possible DNS servers. In some implementations, computing system 110 may provide credentials to coordination service 120 and coordination service 120 may provide configuration information to computing system 110. The configuration information may indicate that a first set of domains should be directed to a first DNS server, while a second set of domains should be directed to a second DNS server. The configuration information may include any number of DNS servers, and in some examples, the configuration information may permit computing system 110 to use a local default DNS server setting to respond to requests that do not qualify for one or more of the DNS server rules identified in the configuration. For example, the configuration provided by coordination service 120 may indicate a DNS server to support two domains but may permit a local default configuration to direct DNS requests when the requests do not include the two domains. The DNS configuration may be implemented in a service executing separate from the operating system or may be implemented at least partially in the operating system in some examples.

Once the configuration is provided by coordination service 120, computing system 110 may identify a DNS request from an application at step 2 and may resolve the request locally at computing system 110 using a locally maintained DNS server at step 3. In some implementations, when a DNS request is identified from an application, computing system 110 may use the configuration provided from coordination service 120 to select a DNS server to support the request. Here, the matching DNS server is located on computing system 110, wherein the local DNS server may be used to translate the domain in the DNS request to a private IP address corresponding to a computing system in the private network. The private IP address is then returned to the requesting application and can be used by the application to communicate a packet to another computing system. In at least one implementation, the configuration provided by coordination service 120 may include one or more rules that associate domains to the DNS servers, wherein a first rule may indicate that a domain is directed to a first DNS server, while a second domain is directed to a second DNS server.

In response to be provided with the private IP address, a packet can be generated by the application that uses the private IP address as a destination address for the packet. Computing system 110 may identify the packet, identify a public IP address for the packet based on configuration information provided by coordination service 120, and encapsulate the packet using the public IP address as the destination address in the encapsulated packet. Once encapsulated, the packet is communicated, at step 4, to the destination computing system 112.

In some implementations, when a computing system joins the private network, coordination service 120 may distribute configuration information to support communications with other computing systems in the same network. The configuration information may include the DNS configuration that directs DNS requests to appropriate servers, a DNS server itself that can be implemented locally at the computing system, private to public IP addressing translations, encryption information, or some other configuration information. The computing system may use this information to both encapsulate and communicate packets to other computing systems, as well as receive and decapsulate packets from other computing systems. Specifically, using computing system 110 as an example, when a packet is received from another computing system in the private network, the packet may be decapsulated using encryption keys if available and the packet can be forwarded to the appropriate application. If no encryption key exists, such as when computing system 110 does not have permission to receive the packet, the packet is dropped.

In some implementations, at step 1, coordination service 120 may provide a search domain that can be used to generate complete domain name requests from applications. In this example, each computing system of computing systems 110-112 may be associated with a unique identifier that is allocated by coordination service 120 or assigned by an administrator associated with the private network. Each of the unique identifiers may be used in conjunction with the search domain to generate a unique domain name for computing systems in the private network. Once the unique identifiers are identified, the unique identifiers and the search domain can be provided to computing systems 110-112. Applications on a computing system, such as computing system 110, may use the unique identifier as part of a domain request that is identified by the computing system and directed to a local DNS on computing system 110, wherein the unique identifier may be appended to the search domain. The computing system may then translate the request to a private destination IP address for the computing system and return the private destination to the requesting application.

Figure 5:
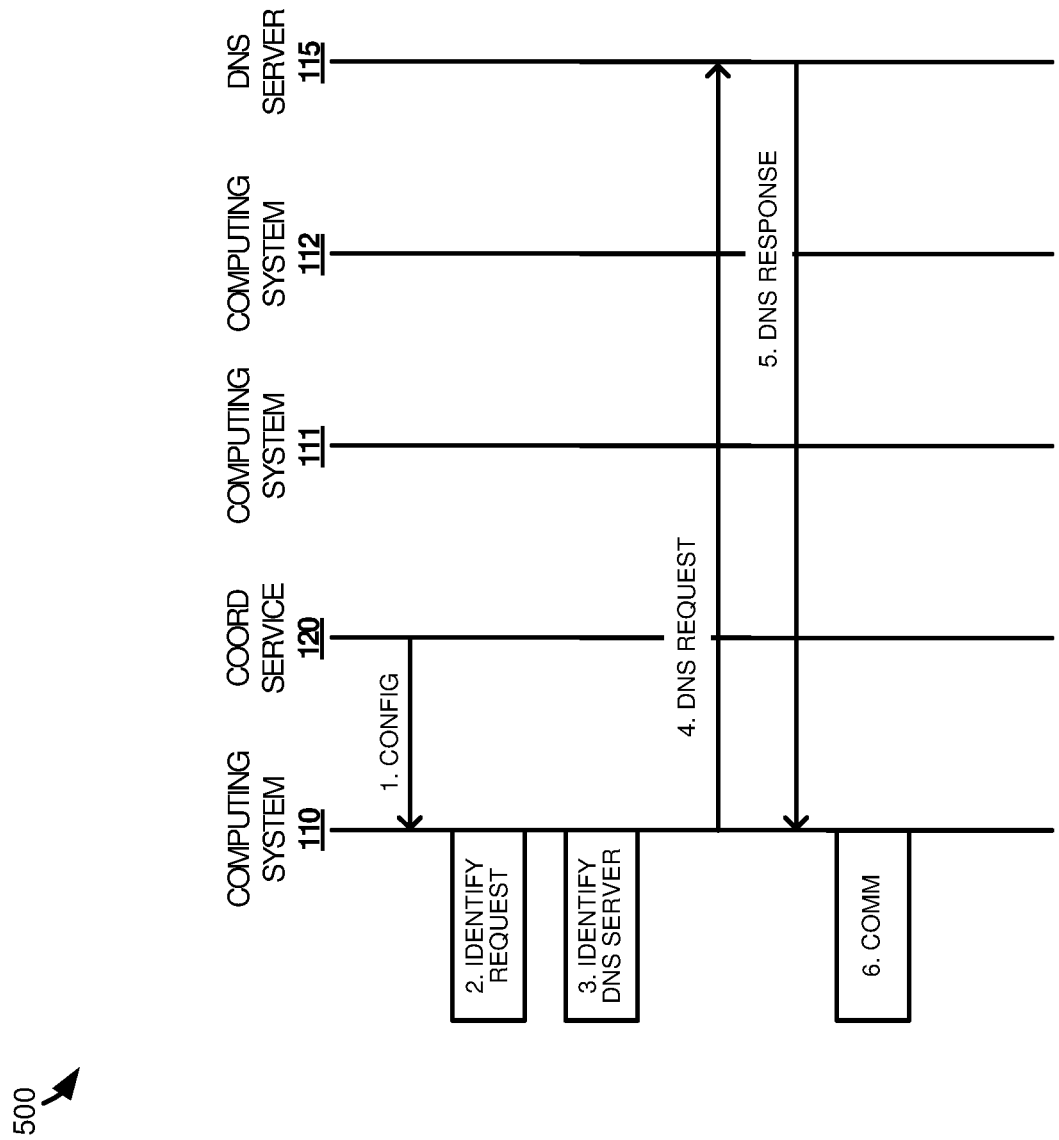
FIG. 5 illustrates a timing diagram of using a DNS server to resolve a DNS request according to an implementation.

FIG. 5 illustrates a timing diagram 500 of using a DNS server to resolve a DNS request according to an implementation. Timing diagram 500 includes computing systems 110-112, coordination service 120, and DNS server 115 of computing environment 100 of FIG. 1.

In timing diagram 500, coordination service provides configuration information to computing system 110. The configuration information may include the DNS configuration that directs DNS requests to appropriate servers, a DNS server itself that can be implemented locally at the computing system, private to public IP addressing translations, encryption information, or some other configuration information. The configuration information may be supplied to computing systems 110-112 when they register with coordination service 120 and may be updated by coordination service 120 if changes occur in the computing environment. Once the configuration information is provided, computing system 110 identifies a DNS request at step 2 and identifies a DNS server to support the request at step 3. In some implementations, the DNS configuration provided by coordination service 120 may indicate a plurality of DNS servers that should be used for various domains. Based on the domain in the DNS request, computing system 110 may select a DNS server to support the request.

Here, computing system 110 identifies DNS server 115 to support the DNS request and forwards the DNS request to DNS server 115 at step 4. Computing system 110 then receives a DNS response from DNS server 115 at step 5 and provides the IP address for the response to computing system 110. Once provided, the application on computing system 110 may generate a packet and communicate the packet at step 6 to another computing system. In some implementations, computing system 110 may identify the packet and determine whether the destination IP address in the packet corresponds to an IP address in the private network subnet. When the destination IP address does not include an address in the private network subnet, the packet may be communicated by a communication interface for computing system 110 to the external. For example, an egress packet associated with a social media post may be communicated by the computing system without being encapsulated by the computing system.

In some implementations, the configuration information provided from coordination service 120 may be updated based on changes in the private network, wherein the changes may include adding or removing computing systems to the network, changing the configuration associated with a computing system in the network, or some other change in association with the network. For example, when computing system 112 is added to the network, computing system 112 may provide public IP addressing and encryption parameters (e.g., a public encryption key) to coordination service 120. Coordination service 120 may then distribute the information to other computing systems in the network, permitting each of the computing systems to update local configurations. The updated local configurations may include the local DNS server, the DNS configuration that selects a DNS server for a request, or some other modification to the local configuration at a computing system.

Although demonstrated in the previous example using computing system 110, similar operations may be performed by the other computing systems in the private network. Specifically, each of the computing systems may maintain DNS configurations and a local DNS server that can be used to direct packets to desired destination computing systems. Each configuration can be updated based on changes to the computing systems or computing system configurations in the network.

Figure 6:
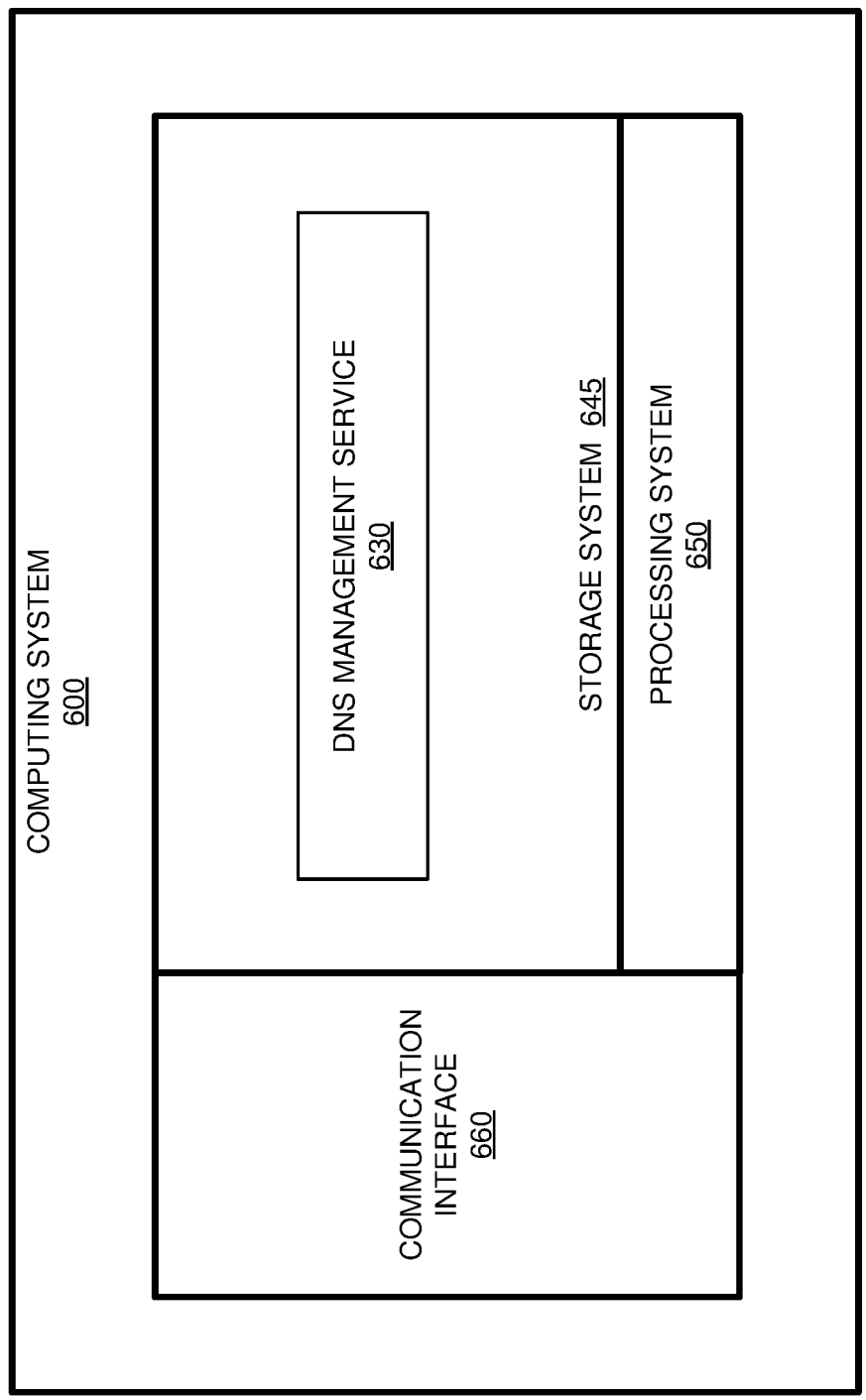
FIG. 6 illustrates a computing system for managing DNS requests according to an implementation.

FIG. 6 illustrates a computing system for managing DNS requests according to an implementation. Computing system 600 is representative of any computing system or systems with which the various operational architectures, processes, scenarios, and sequences disclosed herein for a computing element can be implemented. Computing system 600 is an example computing system of computing elements 110-112 from FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems and a coordination service to obtain a DNS configuration for the computing system 600. The other computing systems may comprise computing systems in the same private network or may comprise computing systems external to the private computing network.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises DNS management service 630, which is configured to provide at least operations 200 and 300 and FIGS. 2 and 3. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, DNS management service 630 directs processing system 650 to identify a DNS request from an application on the computing system and identify a DNS server to support the DNS request from a plurality of DNS servers based on a domain in the DNS request. In some implementations, computing system 600 may communicate with a coordination service that provides configuration information to computing system 600. The configuration information may include a DNS configuration that directs DNS requests to different DNS servers, a DNS server that provides IP addresses in association with one or more domains, private networking information that can associate public and private IP addresses, encryption key information, and the like, or some other configuration information. Based on the configuration information and the domain included in the request from the application, DNS management service 630 may select a DNS server from the available DNS servers provided by the DNS configuration.

Once the DNS server is selected, DNS management service may forward the DNS request to the selected DNS server. In some implementations, the selected DNS server may comprise a local DNS server that is available on computing system 600. This may permit a local DNS server to provide private IP addresses for computing systems in the private network. In other implementations, the selected DNS server may comprise a DNS server on the local network or available via the internet. For example, a domain corresponding to a social media website may be directed to DNS server that is accessible for computing system 600 using the internet. After forwarding the DNS request to the corresponding server, DNS management service 630 may obtain a response to the DNS request from the DNS server. When the DNS server is local to computing system 600, wherein the DNS server may comprise a data structure on computing system 600 capable of associating the DNS with a private IP address. Once identified the private IP address may be provided to the requesting application. When the DNS server is not local or is not associated with the private network, another DNS server may provide an IP address to respond to the request and the IP address (public IP address) may be forwarded to the corresponding application.

When the application is provided with a private IP address, the application may communicate a packet that is identified by DNS management service 630. In response to identifying the packet, the private IP address in the packet is translated to a public destination IP address and the packet is encapsulated using the public destination IP address in the encapsulation header for the packet. Once encapsulated, DNS management service 630 directs processing system 650 to communicate the encapsulated packet to a destination computing system using communication interface 660. In some implementations, the encapsulation may be performed using information provided by the coordination service, wherein the information may include private to public IP translations, encryption information, or some other information.

In some examples, a packet from an application on computing system 600 may include a destination IP address comprising a public IP address. In these instances, DNS management service 630 may direct processing system 650 to forward the packet to a destination computing system without encapsulating the packet.

In some implementations, DNS management service 630 may provide decapsulation operations on packets received from other computing systems at communication interface 660. Specifically, DNS management service 630 may direct processing system 650 to identify an encapsulated packet and identify encryption parameters (e.g., one or more keys) associated with the encapsulated packet. In some implementations, the encryption parameters are supplied by the coordination service and may correspond to a public source IP address for the received packet. Once the packet is decapsulated, DNS management service 630 may direct the decapsulated packet to the corresponding application.

In some examples, when computing system 600 attempts to join the private network, DNS management service 630 may communicate information to the coordination service. The information may include credentials for joining the private network, public encryption key information that permits other computing systems to decapsulate the packets from computing system 600, a public IP address associated with computing system 600, or some other information for computing system 600. At least a portion of this information can be distributed by the coordination service to other computing systems in the private network. Similarly, information about the other computing systems in the private network can be supplied to DNS management service 630, permitting DNS management service 630 to implement the operations described herein.

Although demonstrated in the previous examples as the DNS server for the private network being local to computing system 600, a computing environment may use a DNS server external to the computing systems to manage the private network. For example, when a request is initiated with a domain associated with the private network, the request can be encapsulated and communicated to a DNS server computing system that can resolve the request. Once resolved, the private IP address may be encapsulated and returned to the requesting computing system. In this configuration, the DNS server may join the private network to resolve DNS requests from other computing systems in the private network. Additionally, the communications between computing system 600 and the DNS server may be encrypted.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing element comprising:

receiving configuration information from a coordination server for a private network, wherein the configuration information includes associations between private and public addresses of computing elements on the private network, a list of domain names associated with the private network, encryption parameters for communicating over the private network, and domain names that trigger use of a DNS server executing on the computing element;

identifying a domain name system (DNS) request generated at the computing element by an application executing on the computing element;

in response to the DNS request, identifying the DNS server to support the DNS request from a plurality of DNS servers based on a domain in the DNS request being one of the domain names that trigger use of the DNS server, wherein the plurality of DNS servers include the DNS server and a second DNS server external to the computing element;

forwarding the DNS request to the DNS server;

obtaining a response to the DNS request from the DNS server, wherein the response indicates a private internet protocol (IP) address in a private network subnet;

providing the response to the application;

receiving a packet directed from the application to the private IP address;

encrypting the packet using an encryption key the encryption parameters indicate is associated with the computing element; and transmitting the packet to a public IP address the configuration information indicates is associated with the private IP address.

2. The method of claim 1 further comprising:

wherein encrypting the packet includes, encapsulating the packet with the public IP address as a destination IP address in an encapsulation header for the encapsulated packet.

3. The method of claim 1 further comprising:

receiving a second packet directed to the computing element from the public IP address;

decrypting the packet using a second encryption key the encryption parameters indicate is associated with the public IP address; and forwarding the second packet to the application.

4. The method of claim 1 further comprising:

identifying a second DNS request from a second application on the computing element;

in response to the second DNS request, identifying the second DNS server to support the second DNS request from the plurality of DNS servers based on a second domain in the second DNS request;

forwarding the second DNS request to the second DNS server via a network;

obtaining a second response to the second DNS request from the second DNS server, wherein the second response indicates a second destination IP address; and providing the second response to the second application.

5. The method of claim 4 further comprising:

identifying a second packet from the second application using the second destination IP address as a destination address; and communicating the second packet toward a computing system associated with the second destination IP address.

6. The method of claim 1, wherein the computing element comprises a physical computing system or a virtual machine.

7. The method of claim 1, wherein identifying the DNS request from the application on the computing element comprises identifying, in an operating system of the computing element, the DNS request from the application on the computing element.

8. The method of claim 1, wherein the second DNS server comprises a server accessible via a network connection.

9. A computing apparatus comprising:

a storage system;

a processing system operatively coupled to the storage system; and program instructions stored on the storage system that, when executed by the processing system, direct the computing apparatus to:

receive configuration information from a coordination server for a private network, wherein the configuration information includes associations between private and public addresses of computing elements on the private network, a list of domain names associated with the private network, encryption parameters for communicating over the private network, and domain names that trigger use of a DNS server executing on the computing element;

identify a domain name system (DNS) request from an application on the computing apparatus;

in response to the DNS request, identify the DNS server to support the DNS request from a plurality of DNS servers based on a domain in the DNS request being one of the domain names that trigger use of the DNS server, wherein the plurality of DNS servers include the DNS server and a second DNS server external to the computing element;

forward the DNS request to the DNS server;

obtain a response to the DNS request from the DNS server, wherein the response indicates a private internet protocol (IP) address in a private network subnet for the private network;

provide the response to the application;

receive a packet directed from the application to the private IP address;

encrypt the packet using an encryption key the encryption parameters indicate is associated with the computing element; and transmit the packet to a public IP address the configuration information indicates is associated with the private IP address.

10. The computing apparatus of claim 9, wherein to encrypt the packet, the program instructions further direct the computing apparatus to:

encapsulate the packet with the public IP address as a destination IP address in an encapsulation header for the encapsulated packet.

11. The computing apparatus of claim 9, wherein the program instructions further direct the computing apparatus to:

receive a second packet directed to the computing element from the public IP address;

decrypt the packet using a second encryption key the encryption parameters indicate is associated with the public IP address; and forward the second packet to the application.

12. The computing apparatus of claim 9, wherein the program instructions further direct the computing apparatus to:

identify a second DNS request from a second application on the computing apparatus;

in response to the second DNS request, identify the second DNS server to support the second DNS request from the plurality of DNS servers based on a second domain in the second DNS request;

forward the second DNS request to the second DNS server via a network;

obtain a second response to the second DNS request from the second DNS server, wherein the second response indicates a second destination IP address; and provide the second response to the second application.

13. The computing apparatus of claim 12, wherein the program instructions further direct the computing apparatus to:

identify a second packet from the second application using the second destination IP address as a destination address; and communicate the second packet toward a computing system associated with the second destination IP address.

14. The computing apparatus of claim 9, wherein the computing apparatus comprises a virtual machine.

15. The computing apparatus of claim 9, wherein identifying the DNS request from the application on the computing apparatus comprises identifying, in an operating system of the computing apparatus, the DNS request from the application on the computing apparatus.

16. The computing apparatus of claim 9, wherein the second DNS server comprises a server accessible via a network connection.

17. A system comprising:
a first computing element; and
a second computing element configured to:
  receive configuration information from a coordination server for a private network subnet, wherein the configuration information includes associations between private and public addresses of computing elements in the private network subnet, a list of domain names associated with the private network subnet, encryption parameters for communicating over the private network, and domain names that trigger use of a DNS server executing on the second computing element;
  identify a domain name system (DNS) request generated at the second computing element by an application executing on the second computing element;
  in response to the DNS request, identify a DNS server to support the DNS request from a plurality of DNS servers based on a domain in the DNS request being one of the domain names that trigger use of the DNS server, wherein the plurality of DNS servers include the DNS server and a second DNS server external to the second computing element;
  forward the DNS request to the DNS server;
  obtain a response to the DNS request from the DNS server, wherein the response indicates a private internet protocol (IP) address for the first computing element in the private network subnet;
  provide the response to the application;
  identify a packet from the application using the private IP address as a destination address;
  identify a public IP address associated with the private IP address from the configuration information;
  encapsulate the packet with the public IP address as a destination IP address in an encapsulation header for the encapsulated packet, wherein encapsulation of the packet includes encrypting the packet using an encryption key the encryption parameters indicate is associated with the computing element; and
  communicate the encapsulated packet to the first computing element.

18. The system of claim 17 further comprising:
a coordination server configured to:
  communicate the configuration information to the first computing element and the second computing element.

19. The system of claim 17, wherein identifying the DNS request from the application on the second computing element comprises identifying, in an operating system of the second computing element, the DNS request from the application on the second computing element.

20. The system of claim 17, wherein the second DNS server comprises a server accessible via a network connection.

* * * * *